United States Patent
Kaeppler et al.

(10) Patent No.: US 7,842,272 B2
(45) Date of Patent: Nov. 30, 2010

(54) PROCESS FOR THE REGENERATION OF SULFURIC ACID

(75) Inventors: Klaus Kaeppler, Burghausen (DE); Reinhold Iretzberger, Simbach (DE); Gerhard Nagy, Handenberg (AT)

(73) Assignee: Wacker Chemie AG, Munich (DE)

( * ) Notice: Subject to any disclaimer, the term of this patent is extended or adjusted under 35 U.S.C. 154(b) by 319 days.

(21) Appl. No.: 12/090,140

(22) PCT Filed: Oct. 6, 2006

(86) PCT No.: PCT/EP2006/067136

§ 371 (c)(1), (2), (4) Date: Apr. 14, 2008

(87) PCT Pub. No.: WO2007/042476

PCT Pub. Date: Apr. 19, 2007

(65) Prior Publication Data

US 2008/0293979 A1  Nov. 27, 2008

(30) Foreign Application Priority Data

Oct. 13, 2005  (DE)  ........................ 10 2005 049 084

(51) Int. Cl.
*C01B 17/74* (2006.01)
*C01B 17/90* (2006.01)

(52) U.S. Cl. .................. 423/528; 423/525; 423/531

(58) Field of Classification Search ................ 423/528, 423/531, 525

See application file for complete search history.

(56) References Cited

U.S. PATENT DOCUMENTS 4,157,381 A  6/1979  Bodenbenner et al.
5,683,671 A  11/1997  Mautner et al.

FOREIGN PATENT DOCUMENTS

| | | |
|---|---|---|
| DE | 2632989 A1 | 2/1978 |
| DE | 3151691 A1 | 7/1983 |
| DE | 2731638 C2 | 8/1985 |
| DE | 2503610 A1 | 7/2008 |
| EP | 0084674 A1 | 8/1983 |
| EP | 0378873 A1 | 7/1990 |
| EP | 0784031 A1 | 7/1997 |
| GB | 672723 | 5/1952 |
| GB | 1467795 | 3/1977 |

OTHER PUBLICATIONS

"Schott Engineering, 1987" from Schott Engineering GMBH: Mainz; pp. 12-17.
English Abstract for "Schott Engineering, 1987" from Schott Engineering GMBH, Mainz, pp. 12-17.
Ullmanns Enzyklopadie der technischen Chemie (Ullmann's Enzyclopedia of Industrial Chemistry), 4th edition, vol. 21, pp. 117 ff., Verlag Chemie, Weinheim (1982).
English Abstract for Ullmanns Enzyklopadie der technischen Chemie (Ullmann's Enzyclopedia of Industrial Chemistry), 4th edition, vol. 21, pp. 117 ff., Verlag Chemie, Weinheim (1982).

*Primary Examiner*—Jafar Parsa
(74) *Attorney, Agent, or Firm*—Brooks Kushman P.C.

(57) ABSTRACT

Sulfuric acid contaminated with byproducts of chloromethane scrubbing is regenerated for reuse in the scrubbing process by diluting with water to not lower than about a 55 weight percent concentration, heating the diluted acid to boiling at not more than about 135° C., concentrating the acid to a concentration of minimally 80 weight percent at a temperature of at least 170° C., and reacting the concentrated acid with an oxidizing agent.

7 Claims, No Drawings

PROCESS FOR THE REGENERATION OF SULFURIC ACID

CROSS-REFERENCE TO RELATED APPLICATION

This application is the U.S. national phase of PCT Appln. No. PCT/EP2006/067136 filed Oct. 6, 2006 which claims priority to German application DE 10 2005 049 084.0 filed Oct. 13, 2005.

BACKGROUND OF THE INVENTION

1. Field of the Invention

The invention relates to a process for the regeneration of used sulfuric acid which is contaminated by the secondary components methylsulfuric acid, dimethyl ether, methanol, aliphatic and olefinic hydrocarbons, chlorinated hydrocarbons and organic silicon compounds.

2. Description of the Related Art

Chloromethane is used in the direct synthesis of methylchlorosilanes. The necessary chloromethane is usually produced from methanol and hydrogen chloride, wherein, as secondary products, water and, in small amounts, dimethyl ether are formed. The resultant chloromethane, for production of methylchlorosilanes, must be carefully dried and freed from dimethyl ether.

The hydrogen chloride used for the production of chloromethane mostly originates from hydrolysis reactions of methylchlorosilanes. Therefore, in the chloromethane produced, secondary components of methylchlorosilanes, such as aliphatic and olefinic hydrocarbons and chlorinated hydrocarbons, may also be found. If hydrogen chloride from hydrolysis reactions of methylchlorosilanes is used directly in chloromethane production without intermediate purification, additional organic silicon compounds can pass into the product, in accordance with the vapor pressure.

The chloromethane can be freed from the abovementioned impurities by scrubbing with concentrated sulfuric acid. In this case water, dimethyl ether, olefins and organic silicon compounds are completely removed, and chlorinated hydrocarbons and hydrocarbons are removed in part. The used sulfuric acid, at a concentration of about 75% by weight or less, must be discharged, since its absorption capacity for dimethyl ether is exhausted.

The application DE 25 03 610 A1 describes a process for purifying sulfuric acid contaminated by methylsulfuric acid. In this process, used sulfuric acid originating from the purification of chloromethane is diluted with 10 to 25% by weight of water, based on the sulfuric acid content. Subsequently, steam is introduced, wherein a temperature of 170 to 180° C. is achieved, at which methylsulfuric acid is hydrolyzed to methanol and sulfuric acid, and methanol is distilled off.

The process according to DE 25 03 610 A1 is not applicable to sulfuric acid which, in addition to methylsulfuric acid, dimethyl ether and methanol, still contains additional impurities as described previously, since, owing to the high temperature, cracking processes occur. The resultant carbon is solid like coke and leads to rapid blockage of equipment parts.

In the booklet "Schott Engineering, 1987" from Schott Engineering GmbH, Mainz, pages 12 to 17, a process is described for concentration and purification of waste sulfuric acid, in which oxidizing agents are added in a problem-specific manner to the waste acid.

Oxidation of organic impurities is complex at high loads, since large amounts of oxidizing agents must be added. The oxidation of organosilicon compounds leads to colloidal silicic acid. The filtration, owing to the aggressive medium and owing to the small particle size, is a relatively large problem. Furthermore, contacting relatively large amounts of an oxidizing agent with the dimethyl ether-containing sulfuric acid is a considerable safety risk.

The subsequent addition of oxidizing agents to the process described in DE 25 03 610 A1 is also not expedient, since the coarse coke particles, owing to the small surface area in comparison with the amount thereof, are oxidized only with difficulty, and slowly.

European patent EP 0 784 031 B1 describes a process which removes the above impurities, wherein the sulfuric acid for the purification is diluted in a first step with water and is stripped with steam at a concentration of 45 to a maximum of 55% by weight, is treated in a second purification step by adding an oxidizing agent at 80-130° C. and is subsequently concentrated to at least 90% by weight, in order to reuse it for the chloromethane purification. However, this method has some disadvantages. The used sulfuric acid coming from the MeCl purification already contains solid particles of carbon black and coke. These solids are not removed by the stripping. The oxidation of solids in the roughly 50% strength sulfuric acid proceeds only incompletely. The solids concentrate with time, so that a controlled feed of fresh sulfuric acid is constantly necessary. In addition, there is a relatively high consumption of oxidizing agents, since at the high temperatures, increased autodecomposition of the oxidizing agent occurs and the oxidizing agent is therefore not available for the oxidation.

SUMMARY OF THE INVENTION

An object of the invention was therefore to provide an improved process for the regeneration of used sulfuric acid in which the abovementioned secondary components are removed more effectively, and fewer raw materials are consumed. These and other objects have been achieved by a process for the regeneration of used sulfuric acid which is contaminated by secondary components from among methylsulfuric acid, dimethyl ether, methanol, aliphatic and olefinic hydrocarbons, chlorinated hydrocarbons and organic silicon compounds, which comprises 1. by addition of liquid water and introduction of steam, diluting the used sulfuric acid to a concentration of at most 55% by weight of sulfuric acid and heating it to boiling at most 135° C. and 2. concentrating it to at least 80% by weight at reduced pressure and at a temperature of at least 170° C. and thereafter reacting it with an oxidizing agent.

DETAILED DESCRIPTION OF THE PREFERRED EMBODIMENTS

The process according to the invention has the advantage that a closed and therefore independent sulfuric acid circuit for chloromethane purification is possible. Fresh sulfuric acid is no longer required and thus the hazardous transportation of fresh sulfuric acid is also avoided. In addition, considerably less oxidizing agent is consumed in the process according to the invention. Furthermore, this novel process also has safety advantages, since the oxidation is carried out at lower temperatures and is therefore more easily controllable.

In the first purification step, the used sulfuric acid is preferably diluted with liquid water at ambient temperature to a concentration, the boiling temperature of which at 0.1 MPa is at most 135° C., in particular at most 130° C., and is subsequently treated with steam.

The heat of dilution liberated and the injected steam heat the acid to boiling temperature. 130° C. corresponds to the boiling point of a 55% strength by weight sulfuric acid at 0.1 MPa.

Owing to the dilution with liquid water, the absorbed organic compounds from the used sulfuric acid are released and can subsequently be stripped with steam.

The used sulfuric acid is preferably not diluted below 45% strength by weight sulfuric acid in the first step, since during a later concentration, otherwise, too much water must be removed.

The steam, according to the principle of steam distillation, causes a decrease in the vapor pressure of the secondary components which are discharged from the acid with the steam and can be supplied to a special disposal. In the treatment with steam, reduced pressure can also be employed.

Preferably, use is made of steam at a temperature of 120 to 140° C. At temperatures above 135° C., coking of the secondary components occurs so rapidly that uncontrolled coke deposition occurs.

The amount of steam used is preferably 10 to 200% by weight, in particular 20 to 60% by weight, based on the amount of sulfuric acid in the used sulfuric acid.

Owing to the introduction of steam into the boiling dilute sulfuric acid, volatile compounds, secondary components such as methanol, aliphatic and olefinic hydrocarbons, chlorinated hydrocarbons and volatile organic silicon compounds are removed at least in part. The optionally chlorinated hydrocarbons are chiefly alkanes and olefins having 6 to 7 carbon atoms. The volatile organic silicon compounds are chiefly cyclodimethylsiloxanes, for example hexamethylcyclotrisiloxane, octamethylcyclotetrasiloxane, decamethylcyclopentasiloxane and dodecamethylcyclohexasiloxane, and linear siloxanes having different end groups such as, for example OH, Cl and $OSO_3H$.

As a measure of the organic loading of the used sulfuric acid, the COD value, the chemical oxygen demand, that is the consumption of oxygen for complete oxidation in mg/l, can be taken into consideration, which is determined according to the specification DIN 38409. The used sulfuric acid originating from the chloromethane scrubbing process customarily has a COD of at least 100,000 mg/l. The acid, after the first purification step, has only a COD of at most 10,000 mg/l, but is usually still blackish-brown. This method is relatively susceptible to interference. Therefore, there is also the possibility of determining the loading of the used sulfuric acid on the basis of the color or of the solid content. This is performed by filtration and subsequent weighing.

If the used sulfuric acid is not sufficiently diluted, the secondary components may be only insufficiently discharged, since their energy of interaction with the sulfuric acid is still too high. A consequence thereof is an increased oxidizing agent consumption in the subsequent step.

In a second purification step, the sulfuric acid obtained from the first step is then brought to a concentration at which reuse in chloromethane purification is possible. Preferably, it is at least 80% by weight. More preferably, the sulfuric acid is concentrated to 85 to 95% by weight. The residual loading of oxidizable fractions is removed by addition of small amounts of oxidizing agents. Preferably, only a substream of 10 to 50% of the concentrated sulfuric acid is subjected to the oxidation.

As oxidizing agents, nitric acid, ozone, chlorine, chlorine dioxide or hydrogen peroxide are preferably used. When ozone is used, the oxidation rate can be increased by UV light. More preferably, hydrogen peroxide is used, preferably as a 20 to 50% by weight solution in water, in particular, a 30 to 35% strength by weight solution.

Suitable processes for concentrating dilute sulfuric acids are described, for example, in "Ullmanns Enzyklopädie der technischen Chemie" [Ullmann's Encyclopedia of Industrial Chemistry], 4th edition, volume 21, pp. 117ff, Verlag Chemie, Weinheim (1982).

The oxidation preferably proceeds at 40 to 90° C., more preferably at 40 to 70° C., and at pressures of 0.03 to 0.3 MPa, preferably 0.09 to 0.2 MPa. The amount of added oxidizing agent is calculated on the basis of the determined COD value, the color of the sulfuric acid or of the solids content. At least the stoichiometric amount of oxidizing agent is added. Preferably, at most a two-fold excess, based on the COD, of oxidizing agent is used. An excess of oxidizing agent is especially desirable when the oxidizing agent has a tendency to thermal and/or catalytic autodecomposition. For instance, hydrogen peroxide decomposes thermally to water and oxygen. Heavy metal ions which can be present as impurities in the acid catalyze this autodecomposition.

Preferably, the oxidation is performed in a substream of the roughly 90% strength acid and it is subsequently mixed with the dilute sulfuric acid from step 1 and circulated to the concentration.

The reaction time of the second step is preferably at least 15 minutes, in particular at least 30 minutes.

After the second purification step there results a colorless to slightly light-brownish sulfuric acid in which hydrocarbons are no longer detectable. Preferably, the majority of the sulfuric acid which is concentrated in the second step and treated by addition of an oxidizing agent is fed back to the sulfuric acid scrubbers of the methyl chloride purification. This gives a closed sulfuric acid circuit.

All individual steps can also be carried out in the batch mode. Preferably, however, the processing steps proceed continuously.

EXAMPLES

In the examples hereinafter, use is made of a used sulfuric acid having the following composition:

The sulfuric acid has a concentration of about 76% by weight, is deep black and contains undissolved soot-like cracking products having a solids loading of about 250 mg/l. The solids loading in the used sulfuric acid was determined by filtration through a glass fiber round filter (GF 6) and weighing the dried filter residue.

COD determination as specified in DIN 38409 gave: >200,000 mg/l

Sulfuric acid 76% by weight; water 16% by weight; dimethyl ether 5.5% by weight; monomethyl sulfate 1.8% by weight; chloromethane 0.2% by weight; methanol 0.2% by weight sum of C4-C8 hydrocarbons 0.1% by weight; siloxanes 0.2% by weight. These values were determined via $^1$H-NMR.

Example 1

Similar to EP 0784 031 B1; not According to the Invention

Step 1:

The approximately 76% strength used sulfuric acid of the above described composition is diluted with water to a concentration of approximately 55% by weight and fed in from the top into a glass column packed with glass Raschig rings (length 1 m, diameter 50 mm) at a metering rate of 1.0 l/h. Steam having a temperature of about 130° C. is blown in from the bottom, more precisely at a rate such that the temperature of the effluent acid is 130° C. The concentration of the effluent acid is approximately 50% by weight. The effluent acid is black and contains finely divided cracking products (solids loading 145 mg/l).

The COD is approximately 10,000 mg/l.

Step 2:

To the effluent, about 50% strength, acid, are added about 100 g/l 35% strength $H_2O_2$ solution, equivalent to 1.6 times the stoichiometric amount, or else 143 g of 35% strength $H_2O_2$ per kg of 100% strength $H_2SO_4$, and the mixture is thereafter kept for 30 minutes at 90° C. Subsequently the acid is concentrated at 50 mbar and 190° C. This gives a 90% strength sulfuric acid colored deep black by cracking products (soot) (0.50 l/h; COD 2000 mg/l; solids loading 340 mg/l).

Example 2

According to the Invention

Step 1:
Similar to example 1

Step 2:
The about 50% strength acid from step 1 which was prepurified by stripping with steam (solids loading 145 mg/l) is concentrated at 50 mbar and 190° C. to about 90% by weight (COD 2000 mg/l; solids loading 340 mg/l).

To a subquantity of 50%, that is half, of the concentrated acid, is added about 15 g/l 35% strength $H_2O_2$ solution, equivalent to 9 g of 35% strength $H_2O_2$ per kg of 100% strength $H_2SO_4$, such that the mixing temperature does not exceed 65° C. The mixture is kept for 30 min at about 65° C. Thereafter the mixture is slightly light-brownish, but clear and transparent (COD<500 mg/l; solids loading 100 mg/l).

The invention claimed is:

1. A process for the regeneration of used sulfuric acid from the scrubbing of chloromethanes which is contaminated by secondary components, comprising:
   a) diluting the used sulfuric acid by addition of liquid water and introduction of steam to a concentration of at most about 55% by weight of sulfuric acid and heating the diluted acid to boiling at a temperature of at most 135° C., and
   b) concentrating the dilute acid from step a) to a concentration of at least 80% by weight at reduced pressure and at a temperature of at least 170° C., and thereafter reacting the concentrated acid with an oxidizing agent.

2. The process of claim 1, wherein the oxidation in step b) takes place at a temperature of 40° C. to 90° C.

3. The process of claim 1, wherein the sulfuric acid is concentrated in step b) to 85 to 95% by weight.

4. The process of claim 1, wherein the oxidizing agent, based on the COD, is present in an amount of from stoichiometric to a two-fold excess.

5. The process of claim 1, wherein at least one oxidizing agent is hydrogen peroxide.

6. The process of claim 1, wherein only a substream of between 10 and 50% of the concentrated sulfuric acid is subjected to oxidation.

7. The process of claim 1, further comprising routing the concentrated and oxidized acid obtained from step b) to a chloromethane scrubber.

* * * * *